United States Patent
Williams et al.

(10) Patent No.: US 10,884,740 B2
(45) Date of Patent: Jan. 5, 2021

(54) SYNCHRONIZED ACCESS TO DATA IN SHARED MEMORY BY RESOLVING CONFLICTING ACCESSES BY CO-LOCATED HARDWARE THREADS

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Kimberly M. Fernsler, Cedar Park, TX (US); Hugh Shen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/184,522

(22) Filed: Nov. 8, 2018

(65) Prior Publication Data
US 2020/0150960 A1    May 14, 2020

(51) Int. Cl.
*G06F 9/30*    (2018.01)
*G06F 9/52*    (2006.01)
*G06F 9/38*    (2018.01)

(52) U.S. Cl.
CPC .......... *G06F 9/30043* (2013.01); *G06F 9/38* (2013.01); *G06F 9/52* (2013.01)

(58) Field of Classification Search
CPC .......... G06F 9/30043; G06F 9/52; G06F 9/38; G06F 9/3834; G06F 9/3851; G06F 9/3004
See application file for complete search history.

(56) References Cited

U.S. PATENT DOCUMENTS

| | | |
|---|---|---|
| 5,193,167 A | 3/1993 | Sites et al. |
| 5,611,074 A | 3/1997 | Kantz et al. |
| 5,706,464 A | 1/1998 | Moore et al. |

(Continued)

FOREIGN PATENT DOCUMENTS

WO    2017178925 A1    10/2017

OTHER PUBLICATIONS

Retter et al. U.S. Appl. No. 15/873,570, filed Jan. 17, 2018, Non-Final Office Action dated Jun. 26, 2019.

(Continued)

*Primary Examiner* — Farley Abad
(74) *Attorney, Agent, or Firm* — David M Quinn; Brian F. Russell

(57) ABSTRACT

A processing unit for a data processing system includes a cache memory having reservation logic and a processor core coupled to the cache memory. The processor includes an execution unit that executes instructions in a plurality of concurrent hardware threads of execution including at least first and second hardware threads. The instructions include, within the first hardware thread, a first load-reserve instruction that identifies a target address for which a reservation is requested. The processor core additionally includes a load unit that records the target address of the first load-reserve instruction and that, responsive to detecting, in the second hardware thread, a second load-reserve instruction identifying the target address recorded by the load unit, blocks the second load-reserve instruction from establishing a reservation for the target address in the reservation logic.

20 Claims, 10 Drawing Sheets

(56) References Cited

U.S. PATENT DOCUMENTS

| | | | |
|---|---|---|---|
| 5,895,484 A | 4/1999 | Arimilli et al. |
| 5,895,495 A | 4/1999 | Arimilli et al. |
| 5,968,135 A | 10/1999 | Teramoto et al. |
| 6,067,603 A | 5/2000 | Carpenter et al. |
| 6,067,611 A | 5/2000 | Carpenter et al. |
| 6,081,874 A | 6/2000 | Carpenter et al. |
| 6,108,764 A | 8/2000 | Baumgartner et al. |
| 6,115,804 A | 9/2000 | Carpenter et al. |
| 6,122,674 A | 9/2000 | Olnowich |
| 6,338,122 B1 | 1/2002 | Baumgartner et al. |
| 6,546,429 B1 | 4/2003 | Baumgartner et al. |
| 6,549,989 B1 | 4/2003 | Arimilli et al. |
| 6,591,307 B1 | 7/2003 | Arimilli et al. |
| 6,611,872 B1 | 8/2003 | McCanne |
| 6,615,322 B2 | 9/2003 | Arimilli et al. |
| 6,622,189 B2 | 9/2003 | Bryant et al. |
| 6,625,701 B1 | 9/2003 | Arimilli et al. |
| 6,629,209 B1 | 9/2003 | Arimilli et al. |
| 6,629,210 B1 | 9/2003 | Arimilli et al. |
| 6,629,212 B1 | 9/2003 | Arimilli et al. |
| 6,629,214 B1 | 9/2003 | Arimilli et al. |
| 6,633,959 B2 | 10/2003 | Arimilli et al. |
| 6,711,652 B2 | 3/2004 | Arimilli et al. |
| 6,725,358 B1 | 4/2004 | Moore |
| 6,748,501 B2 | 6/2004 | Arimilli et al. |
| 6,801,986 B2 | 10/2004 | Steely, Jr. et al. |
| 6,839,816 B2 | 1/2005 | Borkenhagen et al. |
| 7,127,561 B2 | 10/2006 | Hill et al. |
| 7,200,717 B2 | 4/2007 | Guthrie et al. |
| 7,228,385 B2 | 6/2007 | Guthrie et al. |
| 7,254,678 B2 | 8/2007 | Alexander et al. |
| 7,328,293 B2 | 2/2008 | Hammarlund et al. |
| 7,363,474 B2 | 4/2008 | Rodgers et al. |
| 7,444,494 B2 | 10/2008 | Goodman et al. |
| 7,480,771 B2 | 1/2009 | Moir et al. |
| 7,529,893 B2 | 5/2009 | Landin et al. |
| 7,620,954 B2 | 11/2009 | Mattina et al. |
| 7,818,388 B2 | 10/2010 | Arimilli et al. |
| 8,140,770 B2 | 3/2012 | Clark et al. |
| 8,521,963 B1 | 8/2013 | Miao et al. |
| 8,539,485 B2 | 9/2013 | Snyder et al. |
| 8,775,906 B2 | 7/2014 | Dodson et al. |
| 8,825,982 B2 | 9/2014 | Kultursay et al. |
| 8,949,539 B2 | 2/2015 | Blumrich et al. |
| 9,058,273 B1 | 6/2015 | Hollaway, Jr. et al. |
| 9,176,877 B2 | 11/2015 | Hollaway, Jr. et al. |
| 9,390,026 B2 | 7/2016 | Guthrie et al. |
| 9,396,127 B2 | 7/2016 | Guthrie et al. |
| 9,430,166 B2 | 8/2016 | Frey et al. |
| 9,465,670 B2 | 10/2016 | Grochowski et al. |
| 9,514,046 B1 | 12/2016 | Nowak et al. |
| 9,569,364 B1 | 2/2017 | Heyrman et al. |
| 2003/0009623 A1 | 1/2003 | Arimilli et al. |
| 2003/0033489 A1 | 2/2003 | Fujiyama |
| 2003/0041225 A1 | 2/2003 | Mattina et al. |
| 2003/0126379 A1 | 7/2003 | Kaushik et al. |
| 2003/0217115 A1 | 11/2003 | Rowlands |
| 2004/0073909 A1 | 4/2004 | Arimilli et al. |
| 2004/0230750 A1 | 11/2004 | Blake et al. |
| 2005/0160226 A1 | 7/2005 | Averill et al. |
| 2006/0085603 A1* | 4/2006 | Guthrie ............... G06F 9/30087 711/141 |
| 2006/0179244 A1 | 8/2006 | Goodman et al. |
| 2006/0179253 A1 | 8/2006 | Fields, Jr. et al. |
| 2006/0200633 A1 | 9/2006 | Hosoe et al. |
| 2006/0271744 A1 | 11/2006 | Goodman et al. |
| 2007/0033345 A1* | 2/2007 | Guthrie ............... G06F 9/30072 711/122 |
| 2007/0124546 A1 | 5/2007 | Blanchard et al. |
| 2007/0150664 A1 | 6/2007 | Dombrowski et al. |
| 2007/0226427 A1 | 9/2007 | Guthrie et al. |
| 2008/0120625 A1 | 5/2008 | Clark et al. |
| 2008/0215824 A1 | 9/2008 | Goodman et al. |
| 2008/0294412 A1 | 11/2008 | Johns |
| 2009/0198695 A1* | 8/2009 | Arimilli ............... G06F 9/30087 |
| 2009/0198918 A1 | 8/2009 | Arimilli et al. |
| 2010/0049952 A1 | 2/2010 | Eddy et al. |
| 2010/0235577 A1 | 9/2010 | Guthrie et al. |
| 2011/0047352 A1 | 2/2011 | Ganfield et al. |
| 2011/0161590 A1 | 6/2011 | Guthrie et al. |
| 2011/0179082 A1 | 7/2011 | Vaghani et al. |
| 2012/0198167 A1* | 8/2012 | Guthrie ............... G06F 9/30087 711/122 |
| 2012/0278431 A1 | 11/2012 | Luna |
| 2013/0205096 A1 | 8/2013 | Guthrie et al. |
| 2013/0205099 A1 | 8/2013 | Guthrie et al. |
| 2014/0115267 A1 | 4/2014 | Pierson et al. |
| 2014/0250276 A1 | 9/2014 | Blaner et al. |
| 2014/0310480 A1 | 10/2014 | Piry et al. |
| 2015/0052315 A1* | 2/2015 | Ghai ....................... G06F 9/467 711/145 |
| 2015/0113226 A1* | 4/2015 | Accapadi ............... G06F 12/127 711/136 |
| 2015/0161054 A1 | 6/2015 | Ghai et al. |
| 2015/0242327 A1 | 8/2015 | Guthrie et al. |
| 2016/0019063 A1 | 1/2016 | Rappoport et al. |
| 2017/0031729 A1 | 2/2017 | Grochowski et al. |
| 2017/0293558 A1* | 10/2017 | Guthrie ............... G06F 12/0811 |
| 2018/0089083 A1* | 3/2018 | Deshpande ......... G06F 12/0831 |
| 2018/0276046 A1 | 9/2018 | Joao et al. |
| 2016/0364332 A1 | 12/2019 | Prakash et al. |

OTHER PUBLICATIONS

Retter et al. U.S. Appl. No. 15/873,515, filed Jan. 17, 2018, Notice of Allowance dated Apr. 4, 2019.
Williams et al. U.S. Appl. No. 16/216,659, filed Dec. 11, 2018, Non-Final Office Action dated May 14, 2020.
Williams et al. U.S. Appl. No. 16/049,011, filed Jul. 30, 2018, Non-Final Office Action dated Dec. 23, 2019.
Williams et al. U.S. Appl. No. 16/049,011, filed Jul. 30, 2018, Notice of Allowance dated Mar. 18, 2020.
Guthrie et al. U.S. Appl. No. 15/873,366, filed Jan. 17, 2018, Non-Final Office Action dated Apr. 5, 2019.
Guthrie et al. U.S. Appl. No. 15/873,366, filed Jan. 17, 2018, Notice of Allowance dated Jul. 11, 2019.
Guthrie et al. Application No. 15/873,366, filed Jan. 17, 2018, Notice of Allowance dated Oct. 21, 2019.
Williams et al. U.S. Appl. No. 16/216,659, filed Dec. 11, 2018, Final Office Action dated Aug. 28, 2020.
Retter et al. U.S. Appl. No. 15/873,570, filed Jan. 17, 2018, Non-Final Office Action dated Dec. 23, 2019.
Retter et al. U.S. Appl. No. 15/873,570, filed Jan. 17, 2018, Notice of Allowance dated Mar. 20, 2020.
Williams, et al., U.S. Appl. No. 16/172,413, filed Oct. 26, 2020, Non-Final Office Action dated Nov. 13, 2019.
Williams, et al., U.S. Appl. No. 16/172,413, filed Oct. 26, 2020, Final Office Action dated Apr. 7, 2020.
Williams, et al., U.S. Appl. No. 16/172,413, filed Oct. 26, 2020, Advisory Action dated Jun. 15, 2020.
Williams et al., U.S. Appl. No. 16/172,413, Filed Oct. 26, 2020, Non-Final Office Action dated Aug. 20, 2020.

* cited by examiner

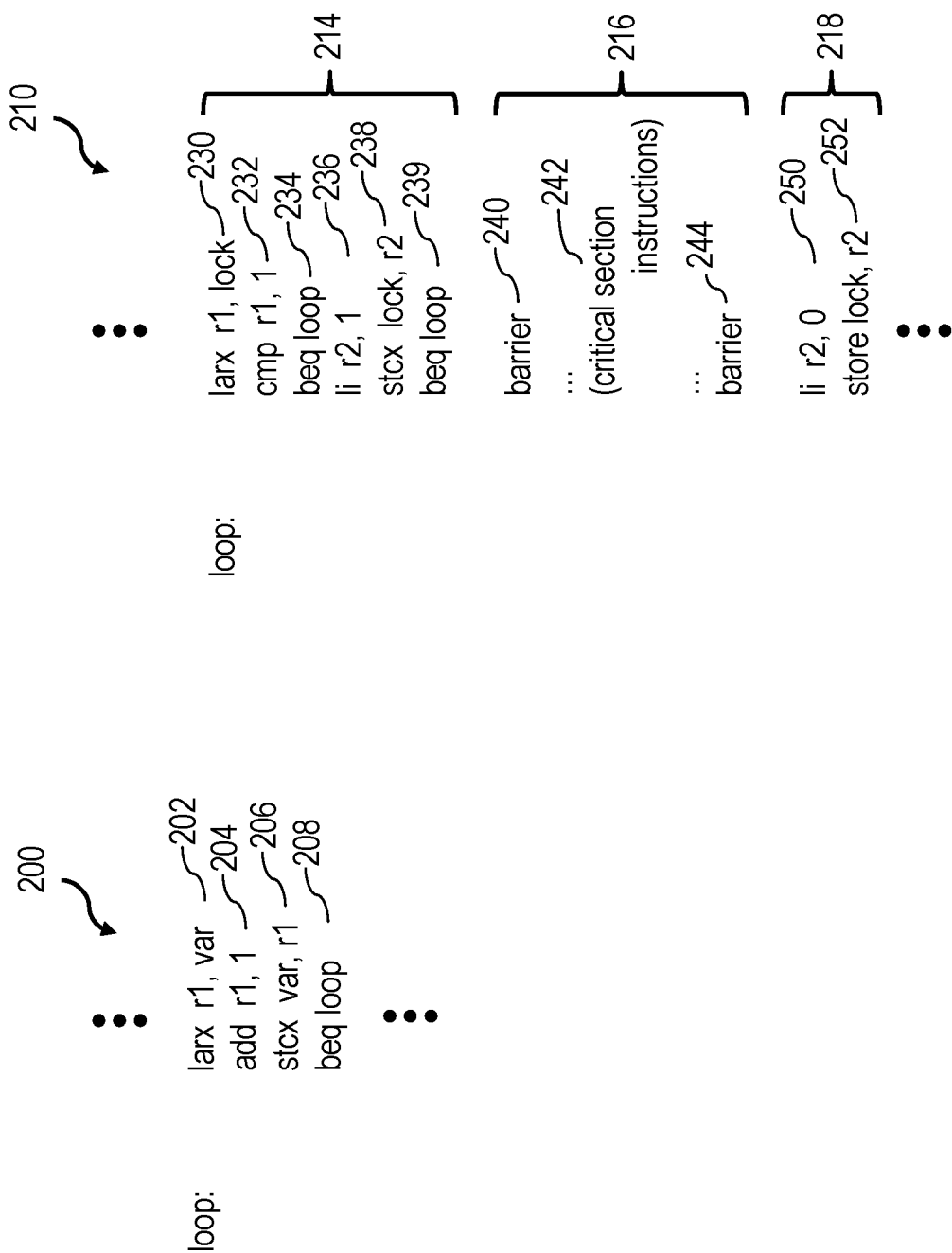

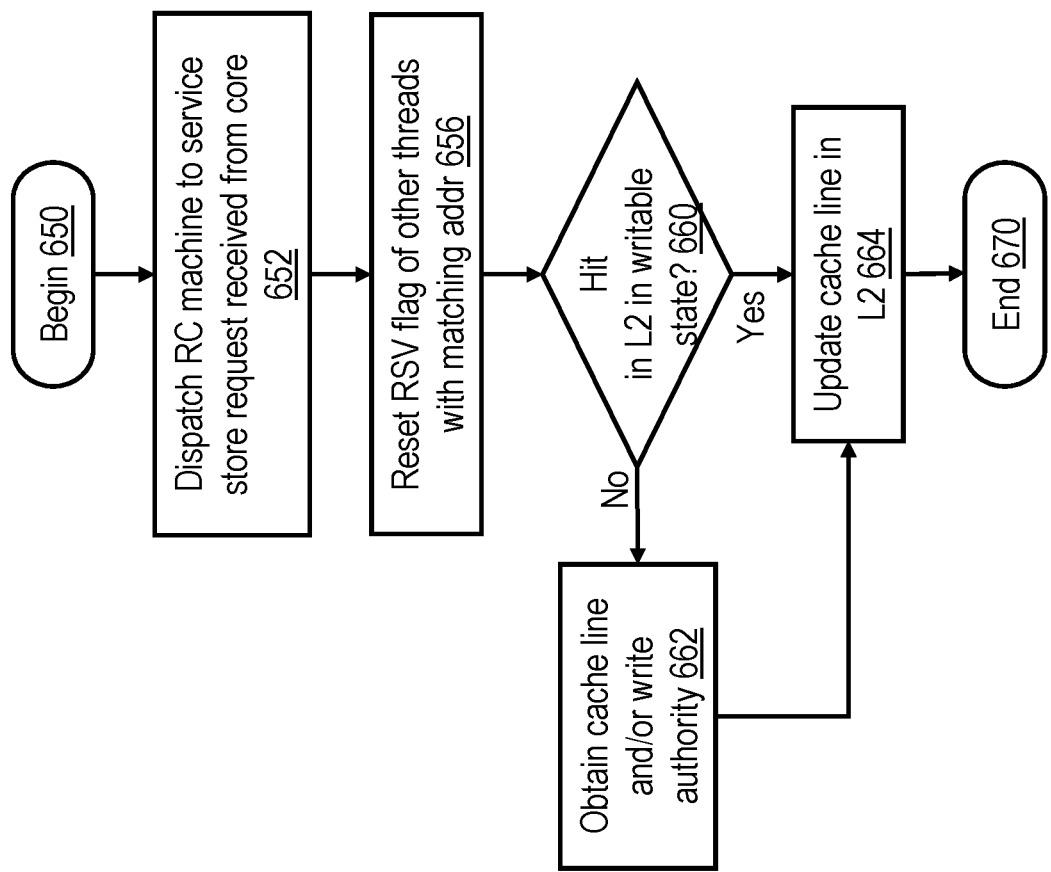

US 10,884,740 B2

SYNCHRONIZED ACCESS TO DATA IN SHARED MEMORY BY RESOLVING CONFLICTING ACCESSES BY CO-LOCATED HARDWARE THREADS

BACKGROUND OF THE INVENTION

The present invention relates in general to data processing system and, in particular, to managing accesses to data in shared memory of a data processing system. Still more particularly, the present invention relates to a processor, data processing system and method for synchronizing accesses to data in a shared memory.

In shared memory multiprocessor (MP) data processing systems, each of the multiple processors in the system may access and modify data stored in the shared memory. In order to synchronize access to a particular granule (e.g., cache line) of memory between multiple processing units and threads of execution, load-reserve and store-conditional instruction pairs are often employed. For example, load-reserve and store-conditional instructions have been implemented in the POWER® instruction set architecture with request codes (opcodes) associated with various mnemonics, referred to herein generally as LARX and STCX. The goal of load-reserve and store-conditional instruction pairs is to load and modify data and then to commit the modified data to coherent memory only if no other thread of execution has modified the data in the interval between the load-reserve and store-conditional instructions. Thus, a read-modify-write operation targeting shared memory can be emulated without the use of an atomic update primitive that strictly enforces atomicity.

BRIEF SUMMARY

According to at least one embodiment, a data processing system includes multiple processing units all having access to a shared memory. A processing unit for a data processing system includes a cache memory having reservation logic and a processor core coupled to the cache memory. The processor includes an execution unit that executes instructions in a plurality of concurrent hardware threads of execution including at least first and second hardware threads. The instructions include, within the first hardware thread, a first load-reserve instruction that identifies a target address for which a reservation is requested. The processor core additionally includes a load unit that records the target address of the first load-reserve instruction and that, responsive to detecting, in the second hardware thread, a second load-reserve instruction identifying the target address recorded by the load unit, blocks the second load-reserve instruction from establishing a reservation for the target address in the reservation logic.

BRIEF DESCRIPTION OF THE SEVERAL VIEWS OF THE DRAWINGS

FIG. 2A depicts a first exemplary instruction sequence that employs load-reserve and store-conditional instructions to synchronize access to shared memory;

FIG. 2B illustrates a second exemplary instruction sequence that employs load-reserve and store-conditional instructions to coordinate execution of a critical section of a multithreaded program;

FIG. 6B is a high level logical flowchart of an exemplary method of processing a store request in lower level cache in accordance with one embodiment;

DETAILED DESCRIPTION

Figure 1:
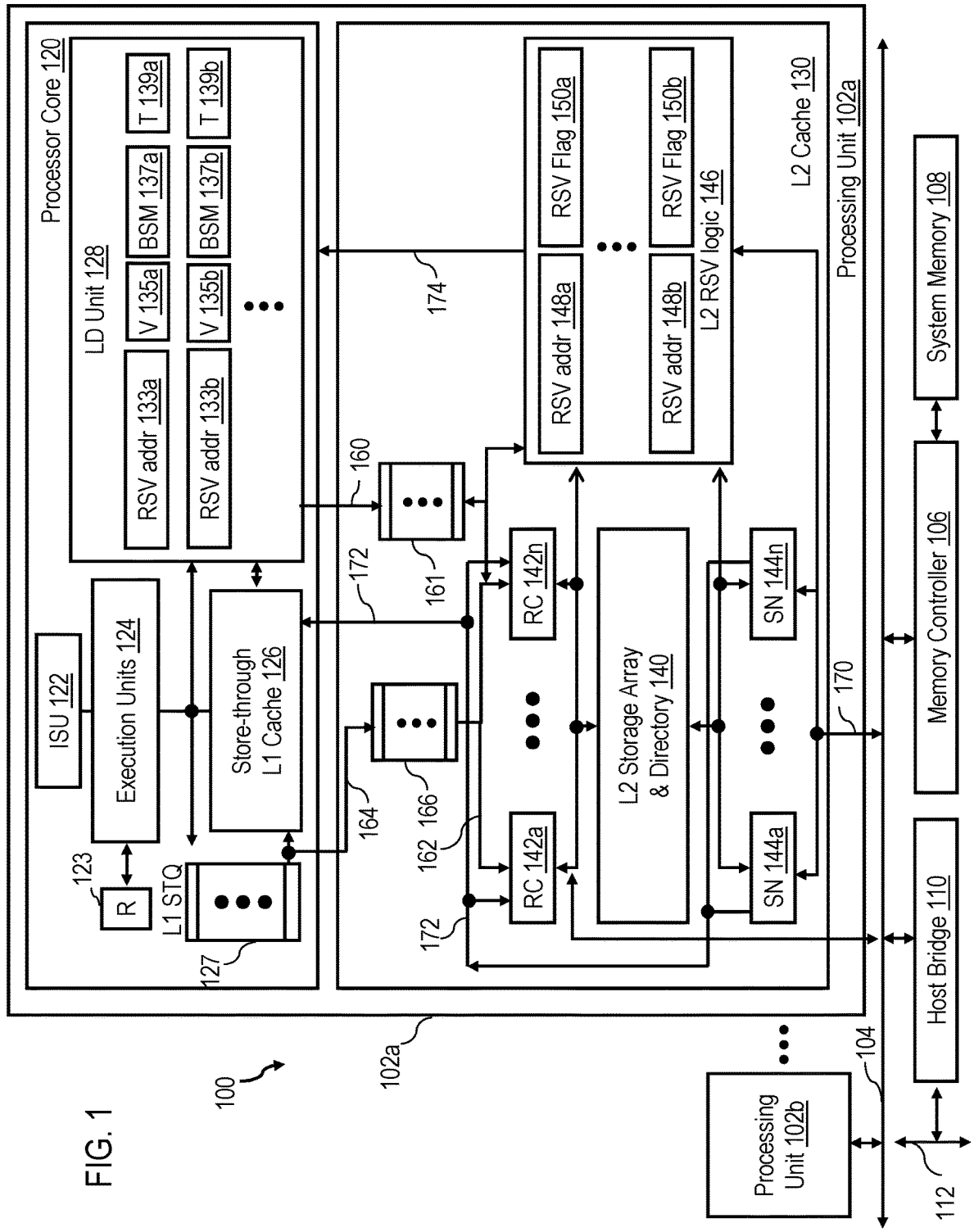
FIG. 1 is a high level block diagram of an illustrative data processing system in accordance with one embodiment.

With reference now to the figures and in particular with reference to FIG. 1, there is illustrated a high level block diagram of a data processing system 100 in accordance with one embodiment. As shown, data processing system 100 includes multiple processing units 102 (including at least processing units 102a-102b) for processing data and instructions. Processing units 102 are coupled for communication to a system interconnect 104 for conveying address, data and control information between attached devices. In the depicted embodiment, these attached devices include not only processing units 102, but also a memory controller 106 providing an interface to a shared system memory 108 and one or more host bridges 110, each providing an interface to a respective mezzanine bus 112. Mezzanine bus 112 in turn provides slots for the attachment of additional unillustrated devices, which may include network interface cards, I/O adapters, non-volatile memory, non-volatile storage device adapters, additional bus bridges, etc.

As further illustrated in FIG. 1, each processing unit 102, which may be realized as a single integrated circuit, includes one or more processor cores 120 (of which only one is explicitly shown) for processing instructions and data. Each processor core 120 includes an instruction sequencing unit (ISU) 122 for fetching and ordering instructions for execution, one or more execution units 124 for executing instructions dispatched from ISU 122, and a set of registers 123 for temporarily buffering data and control information. The instructions executed by execution units 124 include load-reserve and store-conditional instructions, which are utilized to synchronize access to shared memory between a particular thread of execution and other concurrent threads of execution, whether executing in the same processor core 120, a different processor core 120 in the same processing unit 102, or in a different processing unit 102. In a preferred embodiment, execution units 124 execute at least load-reserve and store-conditional instructions in-order (other instructions may or may not be executed out-of-order).

Each processor core 120 further includes an L1 store queue (STQ) 127 and a load unit 128 for managing the completion of store and load requests, respectively, corresponding to executed store and load instructions (including load-reserve and store-conditional instructions). In a preferred embodiment, L1 STQ 127 is implemented as a First-In, First-Out (FIFO) queue containing a plurality of queue entries. Store requests are accordingly loaded in the "top" entry of L1 STQ 127 at execution of the corresponding store instruction to determine the target address, and are initiated when the store request reaches the "bottom" or "commit" entry of L1 STQ 127. Load unit 128 includes core reservation logic for recording addresses for which processor core 120 holds reservations. Specifically, in the illustrated embodiment, the core reservation logic includes, for each hardware thread that may be concurrently executed by processor core 120, a respective reservation address register 133. In the depicted example, which assumes that processor core 120 can each execute at least two concurrent hardware threads, the core reservation logic includes at least reservation address register 133*a* for thread 0 and reservation address register 133*b* for thread 1. Each address register 133 has associated therewith a respective valid bit 135 (e.g., valid bits 135*a*, 135*b*, etc.) indicating whether a reservation for the address contained in the associated address register 133 is valid, a respective blocking state machine (BSM) 137 (e.g., BSMs 137*a*, 137*b*, etc.) that, while a reservation is valid, blocks conflicting synchronizing accesses of other local threads to the associated reserved address during a blocking window, and a respective timer 139 (e.g., timers 139*a*, 139*b*, etc.) defining the duration of the blocking window.

It is important to note that the present application makes a distinction between "instructions", such as load-reserve and store-conditional instructions, and "requests." Load and store "instructions" (including load-reserve and store-conditional instructions) are defined herein as inputs to an execution unit that include an request code (opcode) identifying the type of instruction and one or more operands specifying data to be accessed and/or its address. Load and store "requests," including load-reserve and store-conditional requests, are defined herein as data and/or signals generated following instruction execution that specify at least the target address of data to be accessed. Thus, load-reserve and store-conditional requests may be transmitted from a processor core 120 to the shared memory system to initiate data accesses, while load-reserve and store-conditional instructions are not.

The operation of processor core 120 is supported by a multi-level volatile memory hierarchy having, at its lowest level, shared system memory 108, and at its upper levels two or more levels of cache memory, which in the illustrative embodiment include a L1 cache 126 and a L2 cache 130. As in other shared memory multiprocessor data processing systems, the contents of the memory hierarchy may generally be accessed and modified by threads of execution executing in any processor core 120 in any processing unit 102 of data processing system 100.

In accordance with one embodiment, L1 cache 126, which may include bifurcated L1 data and instruction caches, is implemented as a store-through cache, meaning that the point of cache coherency with respect to other processor cores 120 is located below L1 cache 126 and, in the depicted embodiment, is located at store-in L2 cache 130. Accordingly, as described above, L1 cache 126 does not maintain true cache coherency states (e.g., Modified, Exclusive, Shared, Invalid) for its cache lines, but only maintains valid/invalid bits. Because L1 cache 126 is implemented as a store-through cache, store requests first complete relative to the associated processor core 120 in L1 cache 126 and then complete relative to other processing units 102 at a point of system-wide coherency, which in the depicted embodiment is L2 cache 130.

As further illustrated in FIG. 1, L2 cache 130 contains a storage array and directory 140 that store cache lines of instructions and data in association with their respective memory addresses and coherence states. L2 cache 130 also includes a number of read-claim state machines (RC machines) 142*a*-142*n* for independently and concurrently servicing memory access requests received from the associated processor cores 120. RC machines 142 receive core load requests from LD unit 128 in processor core 120 via load bus 160, an in-order L2 load queue (LDQ) 161, and command bus 162. Similarly, RC machines 142 receive core store requests from L1 STQ 127 in processor core 120 via store bus 164, an in-order L2 store queue (STQ) 166, and command bus 162.

L2 cache 130 further includes a number of snoop state machines (SN machine) 144*a*-144*n* for servicing memory access and other requests received from other processing units 102 via system interconnect 104 and snoop bus 170. SN machines 144 and RC machines 142 are each connected to a back-invalidation bus 172 by which any SN machine 144 or RC machine 142 can signal the invalidation of a cache line to processor core 120.

It is important to note that in a preferred embodiment L2 cache 130 is constructed such that at most a single one of RC machines 142 and SN machines 144 can be active servicing a request targeting a given target cache line address at any one time. Consequently, if a second request is received while a first request targeting the same cache line is already being serviced by an active RC machine 142 or SN machine 144, the later-in-time second request must be queued or rejected until servicing of the first request is completed and the active state machine returns to an idle state.

L2 cache 130 finally includes reservation logic 146 for recording reservations of the associated processor core 120. Specifically, in the illustrated embodiment, reservation logic 146 includes, for each thread that may be concurrently executed by the associated processor core 120, a respective reservation register comprising a reservation address field 148 and a reservation flag 150. In the depicted example, which assumes that processor core 120 can each execute two concurrent hardware threads, reservation logic 146 includes two reservation registers: reservation address field 148*a* and reservation flag 150*a* for thread 0 and reservation address field 148*b* and reservation flag 150*b* for thread 1. When set (e.g., to '1'), a reservation flag 150 indicates that the corresponding thread holds a reservation for the address contained in the associated reservation address field 148 and otherwise indicates no reservation is held. Reservation logic 146 supplies pass/fail indications indicating the success or failure of store-conditional (STCX) requests to processor cores 120 via pass/fail bus 174.

Those skilled in the art will additionally appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing systems such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access requests and atomicity of store requests.

The ordering of memory requests specifies how memory requests may, if at all, be re-ordered relative to the order of their respective load and store instructions in the individual threads of execution in the multiprocessor program. Memory consistency models must define ordering of memory access requests in four general cases: (1) ordering of the memory requests for a load instruction to a following load instruction, (2) ordering of the memory requests for a load instruction to a following store instruction, (3) ordering of the memory requests for a store instruction to a following store instruction, and (4) ordering of the memory requests for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store requests refers to whether or not a given thread of execution can read the value of its own store request before other threads, and furthermore, whether the value written to the distributed shared memory system by the store request becomes visible to other threads in a logically instantaneous fashion or whether the value can become visible to other threads at different points in time. A memory consistency model is called "multi-copy atomic" if the value written by a store request of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access requests are respected. Therefore, in an exemplary embodiment of data processing system 100, in which the distributed shared memory system implements a weak consistency memory model, so called "barrier" (e.g., SYNC) instructions are typically provided to allow the programmer to specify what memory access request orderings and atomicity are to be applied during execution of the multiprocessor program. In particular, a barrier instruction causes the distributed shared memory system to perform any memory accesses initiated by instructions preceding the barrier instruction prior to any memory accesses initiated by instructions following the barrier instruction.

Referring now to FIG. 2A, there is depicted a first exemplary instruction sequence 200 that employs load-reserve and store-conditional instructions to synchronize access to shared memory. In particular, instruction sequence 200 is utilized to update the value of a variable in shared memory.

Instruction sequence 200 begins with a LARX instruction 202 that loads the value of the variable (i.e., var) from shared memory into a private register r1 in the processor core executing the instruction and establishes a reservation for the target address of the variable for the executing hardware thread. The value of the variable is then updated locally in register r1, in this case, by an ADD instruction 204 incrementing the value of the variable by 1. The new value of the variable is then conditionally stored back into shared memory by STCX instruction 206, based, among other things, on whether or not the executing hardware thread still holds a reservation for the target address of the variable. The success or failure of STCX instruction 206 in updating the value of the variable in shared memory is reflected in a condition code register (e.g., one of registers 123) in the processor core. Conditional branch instruction 208 then tests the condition code found in the condition code register and conditionally redirects execution based on the success or failure of STCX instruction 206. If the relevant bit(s) of the condition code register is/are equal to zero, indicating that the conditional update to the variable indicated by STCX instruction 206 failed (e.g., due to an intervening storage-modifying access to the variable by another thread between execution of LARX instruction 202 and STCX instruction 208), instruction sequence 200 will be repeated, and execution branches from conditional branch instruction 208 back to LARX instruction 202. If, however, the conditional update indicated by STCX instruction 206 succeeds, the condition code will be non-zero, and processing will continue with the next sequential instruction following instruction sequence 200.

With reference now to FIG. 2B, there is illustrated a second exemplary instruction sequence 210 that employs load-reserve and store-conditional instructions to coordinate execution of a critical section of a multithreaded program. As indicated, instruction sequence 210 includes, in program order, a lock acquisition sequence 214, critical section 216, and lock release sequence 218.

As is known in the art, critical section 216 is, by definition, a portion of a program that includes accesses to a shared resource (e.g., a shared in-memory data set) that must not be concurrently accessed by more than one hardware thread of the multiprocessor program. In order to keep the various hardware threads from making concurrent accesses to the shared resource, the multithreaded program bounds critical section 206 with barrier instructions 240, 244 that order execution of instructions within critical section 216 with respect to both instructions in the same hardware thread that are outside critical section 216. In addition, the multiprocessor program ensures that not more than one hardware thread at a time enters into a critical section by implementing a lock to which access is synchronized by load-reserve and store-conditional instructions.

In particular, a hardware thread attempts to acquire the lock needed to enter critical section 216 through execution of lock acquisition sequence 214. Lock acquisition sequence 214 begins with a LARX instruction 230 that loads the value of the lock variable (i.e., lock) from shared memory into a private register r1 (e.g., one of registers 123) in the executing processor core. The value of the lock variable is then tested by compare instruction 232 to determine whether or not the lock is currently in a locked state (i.e., the lock is held by another hardware thread). If so, conditional branch instruction 234 causes execution to return to the beginning of polling instruction sequence 212 (which is described in greater detail below). If a determination that the lock is not currently held by another thread, a LOAD immediate instruction 236 places a value of "1" representing a locked state into a register r2. A STCX instruction 238 then conditionally updates the lock variable in shared memory to the locked state, thus securing the lock for the executing thread. As before, the success or failure of the STCX instruction in updating the value of the lock variable in shared memory is reflected in a condition code register in the processor core. Conditional branch instruction 239 tests the condition code found in the condition code register and conditionally redirects execution based on the success or failure of STCX instruction 238. If the relevant bit(s) of the condition code register is/are equal to zero, indicating that the conditional update to the lock variable indicated by STCX instruction 238 failed (e.g., due to an intervening storage-modifying access to the lock variable by another thread between execution of LARX instruction 230 and STCX instruction 238), lock acquisition sequence 214 will be repeated from LARX instruction 230. If, however, the conditional update to the lock variable indicated by STCX instruction 238 succeeds, the condition code will be non-zero, and processing will proceed sequentially to critical section 216. Once critical section 216 completes, the thread will release the lock by updating the lock variable in shared memory by executing a lock release sequence 218 including a LOAD immediate instruction 250 that loads register r2 with a value of "0" representing an unlocked state and a STORE instruction 252 that updates the lock variable in shared memory with this value. Thereafter, execution of the thread proceeds to subsequent instructions, if any.

As a hardware thread of a processor core 120 executes instruction sequence 210 to enter critical section 216, one or more other hardware threads executing on the same processor core 120 (i.e., local or co-located hardware threads) or on other processor cores 120 (i.e., remote threads) may also be concurrently attempting to acquire and update the lock variable utilizing a similar or identical lock acquisition sequence 214. Because of this contention, a given hardware thread may have to repetitively execute lock acquisition sequence 214, as the competing accesses of other hardware threads cancel the reservation of the given hardware thread for the memory location containing the lock variable. As a result, the resources of the processing unit executing the given hardware thread will not be efficiently utilized.

For example, LARX instruction 230, which is utilized to load the lock value and set the reservation for the lock address upon which the execution of STCX instruction 238 depends, is generally a resource-intensive instruction. Irrespective of the chosen implementation of the cache hierarchy, a LARX instruction such as LARX instruction 230 requires communication with the coherence point of the cache hierarchy. For example, in the current embodiment, regardless of whether the target address of LARX instruction 230 hits or misses in L1 cache 126, execution of LARX instruction 230 would require allocation of an entry in L2 LDQ 161, dispatch of an RC machine 142 in L2 cache 130, and update of reservation logic 146. STCX instruction 230 similarly requires communication with the coherence point of the cache hierarchy and consumes a similar set of resources.

Because of the resource-intensive nature of the lock acquisition sequence 214, the present disclosure recognizes that it would be desirable for lock acquisition sequence 214 to be executed as few times as possible. To promote this goal, the present disclosure reduces contention between hardware threads executing on the same processor core for memory addresses that are the target of synchronizing memory accesses. In a preferred embodiment, inter-thread contention is reduced by a processor core blocking a hardware thread's synchronizing access to a memory location for which another of its hardware threads holds a reservation.

Figure 2C:
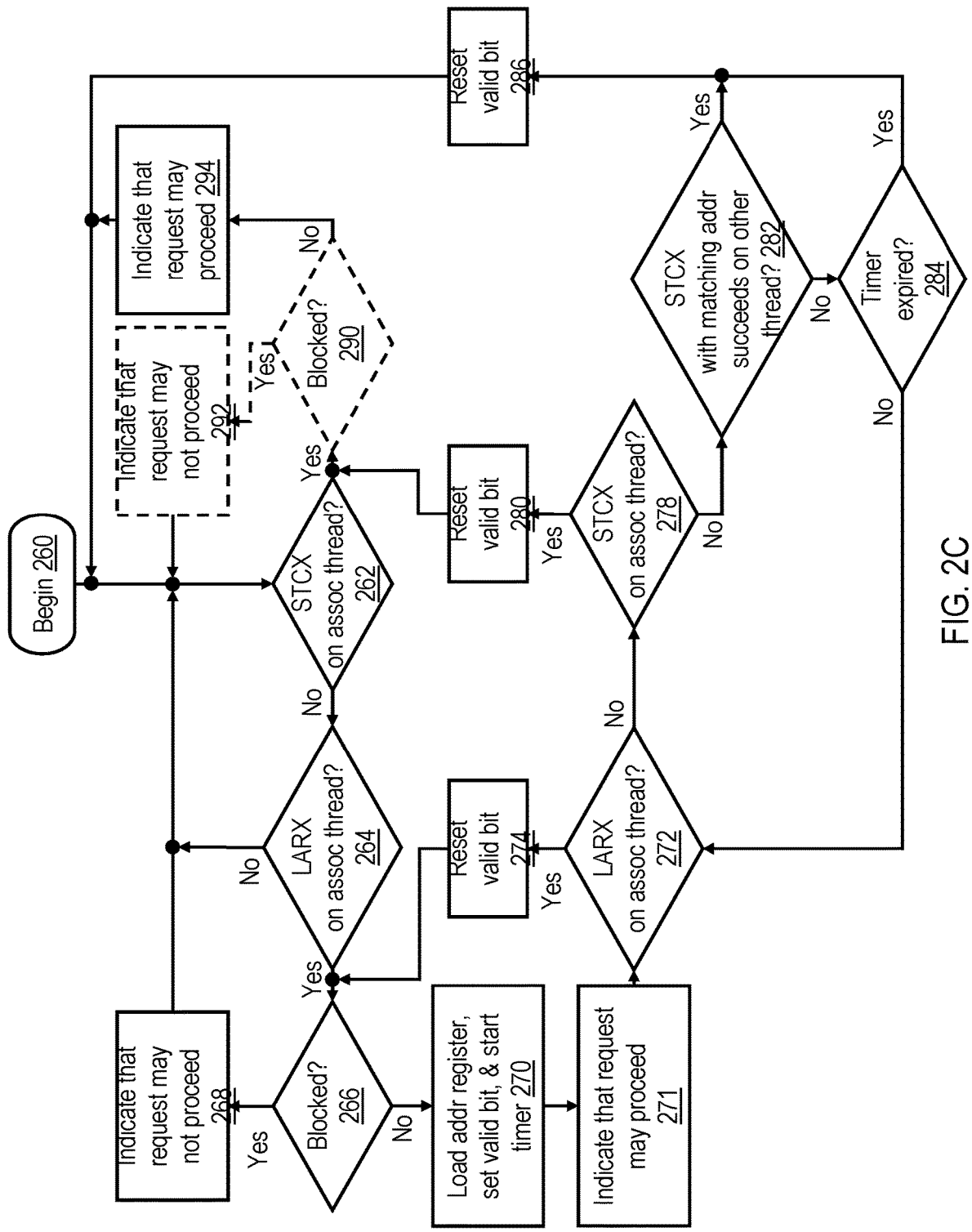
FIG. 2C is a high level logical flowchart of an exemplary method by which a processor core blocks a conflicting synchronizing access by one of its hardware threads.

With reference now to FIG. 2C, there is illustrated a high level logical flowchart of an exemplary method by which a processor core blocks a conflicting synchronizing access by one of its hardware threads. The illustrated process can be performed, for example, by LD unit 128 per hardware thread concurrently executed by processor core 120. Thus, if processor core 120 is executing N hardware threads concurrently, N instances of the process of FIG. 2C will be running concurrently.

The process of FIG. 2C begins at block 260 and then proceeds to blocks 262-264, which illustrates LD unit 128 monitoring for LARX and STCX requests generated by the execution of corresponding LARX and STCX instructions in a given hardware thread associated with this instance of the process of FIG. 2C. If no LARX or STCX request of the associated hardware thread is detected, the process iterates at blocks 262-264. If a LARX request of the associated hardware thread is detected, the process passes to block 266 and following blocks. If, on the other hand, a STCX request of the associated hardware thread is detected, the process passes to optional block 290 and following blocks.

Referring first to block 266, in response to detection of a LARX request by the associated hardware thread, LD unit 128 determines whether or not the LARX request is blocked, that is, whether a BSM 137 associated with another hardware thread of the same processor core 120 is active protecting the target address of the LARX request (i.e., the address contained in the reservation address register 133 associated with the BSM 137 matches that of the LARX request and the valid bit 135 associated with the BSM 137 is set). If so, LD unit 128 indicates that the LARX request may not proceed (block 268). In some embodiments, this indication may include setting/resetting a bit in the LARX request or by marking/unmarking an entry in an L1 load queue (not illustrated) that buffers the LARX request to prevent the request from progressing to L2 LDQ 161 until the marking is removed. In other embodiments, like that shown in FIG. 3, the LARX request is simply discarded, and LD unit 128 provides the indication to execution units 124 to cause the LARX instruction that generated the LARX request to be re-executed. Following block 268, the process of FIG. 2C returns to blocks 262-264.

If LD unit 128 determines at block 266 that the LARX request is not blocked, the process proceeds to block 270, which illustrates LD unit 128 loading the relevant reservation address register 133 with the target address of the LARX request. In addition, at block 270 LD unit 128 sets the relevant valid bit 135 and starts the timer 139 defining the maximum duration for which the reserved address will be protected by the associated BSM 137. At block 271, LD unit 128 additionally indicates that the LARX request may proceed to L2 cache 130. For example, in some embodiments, this indication can be conveyed by setting/resetting a bit in the LARX request or by marking/unmarking an entry in an L1 load queue. The LARX request may then be forwarded to L2 cache 130 for processing in the normal course of processing (e.g., based on availability of an unallocated entry in L2 LDQ 161).

As indicated at blocks 272 and 278, while the timer 139 remains unexpired (at block 284), LD unit 128 continues to monitor for LARX and STCX requests by the associated hardware thread. If a LARX request in the associated hardware thread is detected at block 272, LD unit 128 resets the valid bit 135 of its associated hardware thread to indicate that the prior core reservation of the hardware thread is no longer valid (block 274). The newly detected LARX request is then processed as depicted at block 266 and following blocks, which have been described. If a STCX request in the associated hardware thread is detected at block 278, LD unit 128 resets the associated valid bit 135 to indicate that the prior core reservation of the hardware thread is no longer valid (block 280). Thereafter, the process passes to optional block 290 and following blocks, which are described below.

If neither a LARX request nor a STCX request of the associated hardware thread is detected at blocks 272 and 278, the process passes to blocks 282, which illustrates LD unit 128 additionally monitoring for receipt via pass/fail bus 174 of an indication that a STCX of a different local hardware thread to the reserved address of the associated hardware thread has succeeded. In response to detection of such an indication, LD unit 128 resets the valid bit 135 of the associated hardware thread to indicate that the prior core reservation of the associated hardware thread is no longer valid (block 286). Thereafter, the process returns to blocks 262-264, which have been described. If no detection is made at block 282, LD unit 128 determines at block 284 whether or not the timer 139 of the associated hardware has expired. If so, LD unit 128 resets the valid bit 135 of the associated hardware thread to indicate that the prior core reservation of the hardware thread is no longer valid (block 286), and the process returns to blocks 262-264. If, however LD unit 128 determines at block 284 that the associated timer 139 has not yet expired, the process returns to block 272 and following blocks, which have been described.

Referring now to block 290, LD unit 128 optionally determines whether the STCX request detected at block 262 or block 278 is blocked by the BSM 137 of another hardware thread. (The detection at block 290 is optional because a STCX request to a scratch address may be utilized to clear any outstanding reservations as part of an operating system thread migration. It can be advantageous not to delay these STCX requests.) A BSM 137 blocks the STCX request only if the target address of the STCX request matches the address contained in the reservation address register 133 of the other hardware thread and the valid bit 135 is set. Block 290 is optional in that, in some embodiments, BSMs 137 may block only conflicting LARX requests of other local hardware threads. In other embodiments, BSMs 137 may instead block both conflicting LARX requests and STCX requests of other local hardware threads. In response to a determination at block 290 that the STCX request of the associated hardware thread is blocked, LD unit 128 indicates that the STCX request may not proceed (block 292). In some embodiments, this indication can be provided by setting/resetting a bit in the STCX request or by marking/unmarking an entry in L1 STQ 127 that buffers the STCX request to prevent the STCX request from being forwarded to L2 STQ 166. In other embodiments, like that shown in FIG. 5, the STCX request is simply discarded, and LD unit 128 provides the indication to execution units 124 to cause the STCX instruction that generated the STCX request to be re-executed. If, however, LD unit 128 determines at block 290 that the STCX request is not blocked or if block 290 is omitted, the process proceeds to block 294, which illustrates LD unit 128 indicating that the STCX request may proceed to L2 cache 130. For example, in some embodiments, this indication can be conveyed by setting/resetting a bit in the STCX request or by marking/unmarking an entry in an L1 STQ 127. The STCX request may then be forwarded to L2 cache 130 for processing in normal course of processing (e.g., based on availability of an unallocated entry in L2 STQ 166). Following block 292 or block 294, the process of FIG. 2C returns to blocks 262-264, which have been described.

Figure 3:
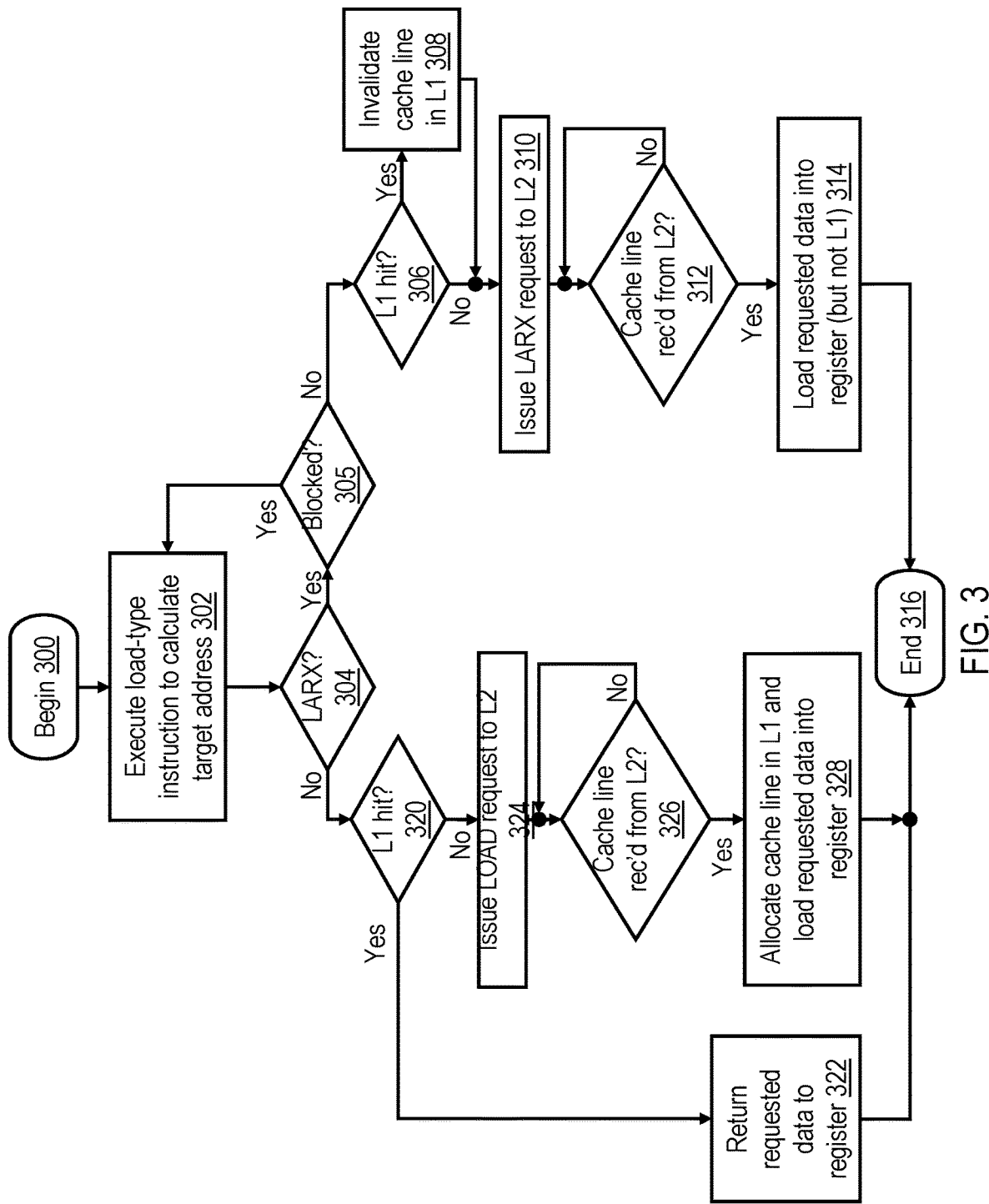
FIG. 3 is a high level logical flowchart of an exemplary method of processing a load-type instruction in a processor core in accordance with one embodiment.

With reference now to FIG. 3, there is depicted a high level logical flowchart of an exemplary method by which a processor core 120 of data processing system 100 processes a load-type instruction (e.g., a LOAD or LARX instruction) in accordance with one embodiment. As shown, the process begins at block 300 and thereafter proceeds to block 302, which illustrates execution units 124 receiving a load-type instruction, such as a LOAD or LARX instruction, from ISU 122 and then executing the load-type instruction to calculate the load target address. In a preferred embodiment, execution units 124 execute LARX instructions within a hardware thread in-order and without pipelining, meaning that the data words(s) requested by a LARX instruction must be loaded to one or more registers 123 in processor core 120 before the next LARX or STCX instruction begins execution. These restrictions simplify the management of reservations by reservation logic 146 in L2 cache 130.

Following execution of the load-type instruction, an indication of the instruction type and the load target address are received from execution units 124 by LD unit 128. As illustrated at block 304, if the indication of the instruction type indicates the load-type instruction executed at block 302 was not a LARX instruction, LD unit 128 performs the processing illustrated at block 320 and following blocks, which are described below. If, however, the load-type instruction executed at block 302 was a LARX instruction, LD unit 128 performs the processing depicted at block 305 and following blocks.

At block 305, LD unit 128 determines whether or not progress of a LARX request corresponding to the LARX instruction executed at block 302 is blocked by a BSM 137 of another local hardware thread, as described above with reference to block 266 of FIG. 2C. If so, the LARX request is discarded, and the LARX instruction is re-executed, as indicated by the process returning to block 302. If, however, LD unit 128 determines at block 305 that progress of a LARX request corresponding to the executed LARX instruction is not blocked, LD unit 128 determines at block 306 whether or not the load target address of the LARX request resides in L1 cache 126. If so, LD unit 128 invalidates the cache line containing the load target address in L1 cache 126 (block 308). Those skilled in the art should appreciate that the invalidation of the cache line containing the load target address in L1 cache 126 is a simplifying design choice and that in other embodiments the cache line containing the load target address need not be invalidated in L1 cache 126. Following block 308 or in response to determining that the load target address of the LARX instruction missed in L1 cache 126, LD unit 128 issues a LARX request to L2 cache 130 via load bus 160 (block 310). The LARX request includes, for example, an indication of the request type, the load target address, and an identifier of the issuing thread. After buffering the LARX request in L2 LDQ 161, L2 cache 130 dispatches the LARX request to an RC machine 142 for servicing, as described further below with reference to FIG. 4.

Next, at block 312, LD unit 128 awaits return of the requested cache line identified by the load target address from L2 cache 130. In response to receipt of the requested cache line, LD unit 128 transfers the data word(s) associated with the load target address into a core register 123, but does not cache the requested cache line in L1 cache 126 (block 314). It should be appreciated that in alternative embodiments that do not invalidate the requested cache line at block 308, the requested cache line can instead be cached in L1 cache 126 to permit subsequent loads (including subsequent load-reserve requests), to hit in L1 cache 126. Following block 314, the process of FIG. 3 terminates at block 316.

Referring now to block 320, in response to LD unit 128 determining that the load-type request is not a LARX request, but is instead a LOAD request (e.g., a fronting LOAD), LD unit 128 also determines whether or not the load target address hits in L1 cache 126. If so, LD unit 128 simply places a copy of the requested data word(s) in the appropriate core register 123 (block 322). If, however, the load target address misses in L1 cache 126, LD unit 128 issues a LOAD request to the associated L2 cache 130 via load bus 160 (block 324). The LOAD request may include, for example, an indication of the request type, the load target address, and an identifier of the issuing thread. After buffering the LOAD request in L2 LDQ 161, L2 cache 130 dispatches the LOAD request to an RC machine 142 for servicing, as described further below with reference to FIG. 4.

Next, at block 326, LD unit 128 waits until the requested cache line containing the load target address is returned by L2 cache 130. In response to receipt of the requested cache line, LD unit 128 transfers the data word(s) associated with the load target address into a core register 123 and allocates the requested cache line in L1 cache 126 (block 328). Following block 322 or block 328, the process of FIG. 3 terminates at block 316.

Figure 4:
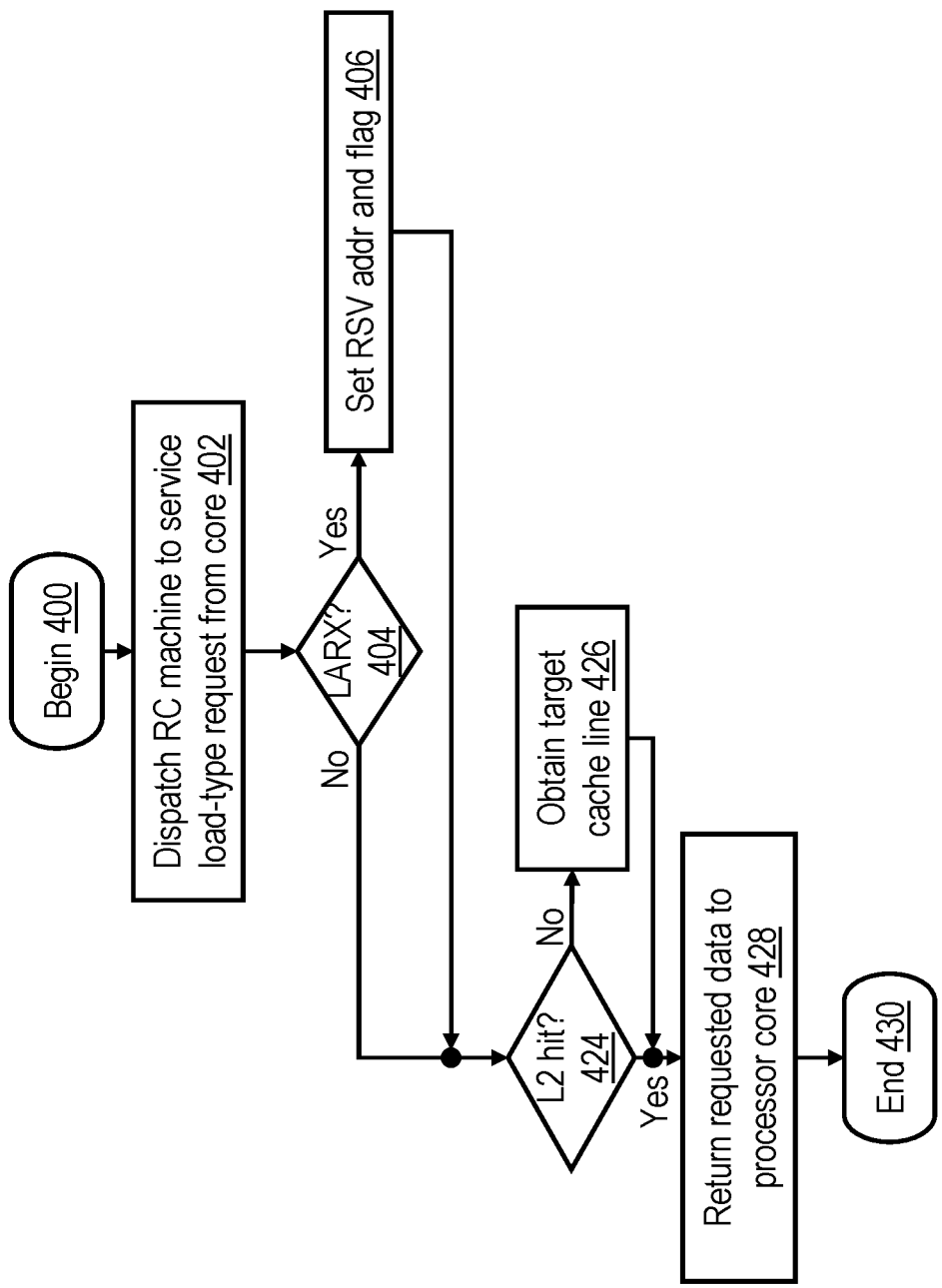
FIG. 4 is a high level logical flowchart of an exemplary method of processing a load-type request in a lower level cache in accordance with one embodiment.

Referring now to FIG. 4, there is depicted a high level logical flowchart of an exemplary method by which an L2 cache 130 of data processing system 100 processes a load-type request in accordance with one embodiment. The process begins at block 400 and then proceeds to block 402, which depicts L2 cache 126 dispatching an RC machine 142 to service a next load-type request of the associated processor core 120 that is enqueued in L2 LDQ 161. Next, at block 404, the dispatched RC machine 142 determines whether or not the load-type request is a LARX request or a LOAD request. If the load-type request is a LOAD request, the process passes to block 424 and following blocks, which are described below. If, however, RC machine 142 determines at block 404 that the load-type request is a LARX request, the process proceeds to block 406.

As illustrated at block 406, RC machine 142 establishes a reservation for the load target address in L2 cache 130 in the reservation register of the appropriate hardware thread by placing the load target address in the appropriate reservation address field 148 and setting the associated reservation flag 150.

Following block 406, the process proceeds to block 424.

At block 424, the dispatched RC machine 142 determines whether or not the load target address of the LOAD or LARX request hits in L2 storage array and directory 140. If so, the process passes directly to block 428. If not, RC machine 142 issues a request on system interconnect 104 in order to obtain a copy of the requested cache line from another cache hierarchy or system memory 108 (block 426). Following block 426, the process proceeds to block 428, which depicts RC machine 142 returning the requested cache line to the associated processor core 120. The return of the requested cache line to the associated processor core 120 at block 430 ends all operations of RC machine 142 required to service the LOAD or LARX request. The process of FIG. 4 thereafter terminates at block 430.

Figure 5:
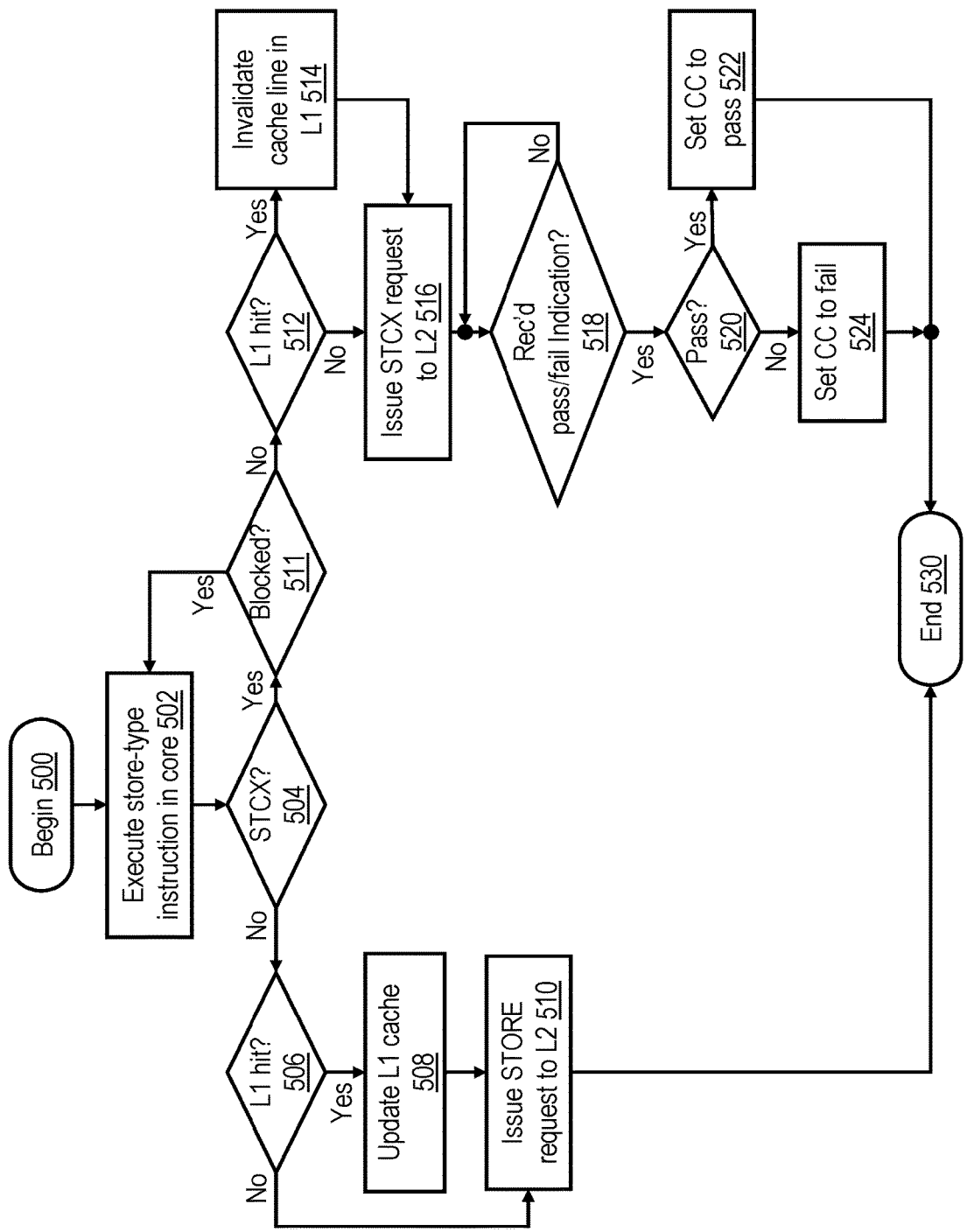
FIG. 5 is a high level logical flowchart of an exemplary method of processing a store-type instruction in a processor core in accordance with one embodiment.

With reference now to FIG. 5, there is illustrated a high level logical flowchart of an exemplary method of processing a store-type instruction in a processor core in accordance with one embodiment. As depicted, the process begins at block 500 and thereafter proceeds to block 502, which illustrates execution units 124 receiving a store-type instruction, such as a STORE or STCX instruction, from ISU 122 and then executing the store-type instruction to calculate the store target address. As with the LARX execution described above, execution units 124 also preferably execute STCX instructions appearing in the same hardware thread in-order and without pipelining with respect to both LARX and STCX instructions.

Upon execution of the store-type instruction, execution units 124 place a corresponding store-type request including the store target address calculated by execution of the STCX instruction, a thread identifier, and store data within L1 STQ 127. In one preferred embodiment, L1 STQ 127 is implemented as a shared FIFO queue that buffers and orders store requests of all threads executing within processor unit 102. When the store-type request corresponding to the executed store-type instruction reaches the bottom or commit entry of L1 STQ 127, L1 STQ 127 determines at block 504 whether or not the store-type request is a STCX request. If so, the process passes to block 511 and following blocks, which are described below. If, however, the store-type request is not a STCX request, but is instead a STORE request, the process of FIG. 5 proceeds from block 504 to block 506.

At block 506, L1 STQ 127 additionally determines if the store target address of the STORE request hits in L1 cache 126. If so, L1 STQ 127 updates the target cache line held in L1 cache 126 with the store data referenced by the STORE request (block 508). Following block 508 or in response to the store target address missing in L1 cache 126 at block 506, L1 STQ 127 removes the STORE request from L1 STQ 127 and issues the STORE request to L2 STQ 166 of L2 cache 130 via store bus 164 (block 510). Following block 510, the process of FIG. 5 ends at block 530.

Referring now to block 511, L1 STQ unit 127 determines whether or not progress of the STCX request corresponding to the STCX instruction executed at block 502 is blocked by a BSM 137 of another local hardware thread, as described above with reference to block 290 of FIG. 2C. If so, the STCX request is discarded, and the STCX instruction is re-executed, as indicated by the process returning to block 502. If, however, L1 STQ 127 determines at block 511 that progress of the STCX request is not blocked, L1 STQ 127 additionally determines at block 512 if the store target address of the STCX request hits in L1 cache 126. If so, L1 STQ 127 invalidates the target cache line held in L1 cache 126 (block 514). Following block 514 or in response to the store target address missing in L1 cache 126 at block 512, L1 STQ 127 issues the STCX request to L2 STQ 166 of L2 cache 130 via store bus 164 (block 516). L1 STQ 127 then awaits return via pass/fail bus 174 of a pass/fail indication for the STCX request indicating whether or not the STCX request succeeded in updating L2 cache 130 (block 518). In response to receipt of the pass/fail indication via pass/fail bus 174, processor core 120 provides the pass/fail indication to execution units 124 (e.g., to indicate whether the path of execution should change) and, as shown at blocks 520-524, updates a condition code register 123 to indicate whether the STCX request passed or failed. Thereafter, the STCX request is deallocated from L1 STQ 127, and the process of FIG. 5 terminates at block 530.

Figure 6A:
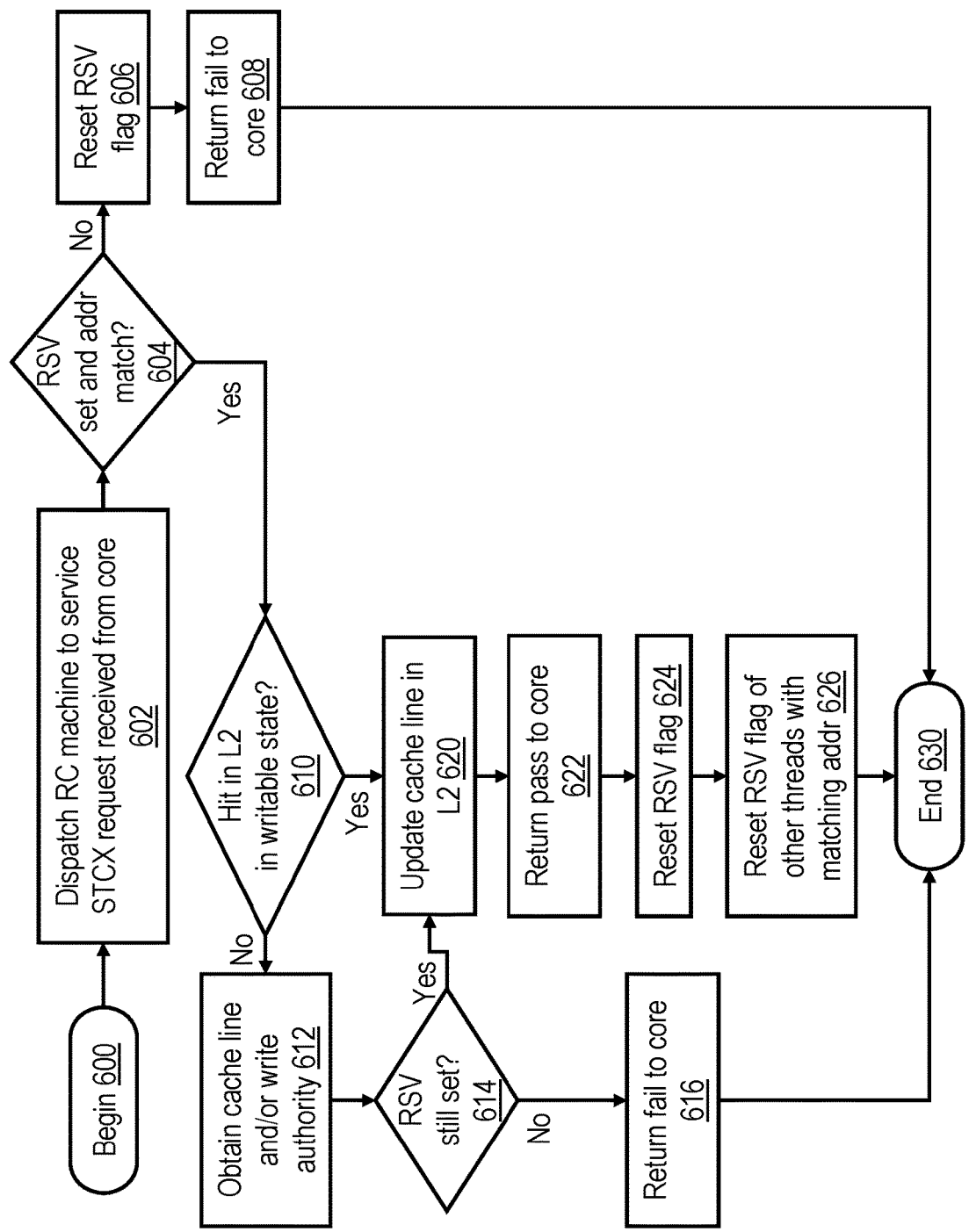
FIG. 6A is a high level logical flowchart of an exemplary method of processing a store-conditional request in lower level cache in accordance with one embodiment.

Referring now to FIG. 6A, there is depicted a high level logical flowchart of an exemplary method of processing a STCX request in a lower level cache in accordance with one embodiment. As described above, STCX requests are received by L2 cache 130 within L2 STQ 166 via store bus 164. In some embodiments, L2 STQ 166 may be implemented, like L1 STQ 127, as a FIFO queue. In such embodiments, the process begins at block 600 in response to receipt of a store-type request in the bottom entry of L2 STQ 166. The store request at the bottom entry of L2 STQ 166 will then be selected for dispatch to an idle RC machine 142 for processing, as shown at block 602.

In response to receipt of a STCX request for servicing, the dispatched RC machine 342 transitions to the busy state and determines at block 604 whether the issuing hardware thread has a valid reservation for the store target address by determining whether the thread's RSV flag 150 is set and the associated RSV register 148 specifies a reservation address matching the store target address (block 604). If not, RC machine 342 resets the RSV flag 150 of the issuing thread (block 606) and returns a fail indication to the processor core 120 via pass/fail bus 174 to report that the STCX request made no update to L2 cache 130 (block 608). Thereafter, the RC machine 142 allocated to service the STCX request returns to the idle state, and the process of FIG. 6 ends at block 630.

Returning to block 604, in response to RC machine 142 determining that the issuing hardware thread has a valid reservation for the store target address of the STCX request, RC machine 142 determines whether or not the store target address of the STCX request hits in L2 storage array and directory 140 in a "writeable" coherence state that confers authority on L2 cache 130 to modify the target cache line (block 610). If so, the STCX will succeed in the conditional update of shared memory, and the process passes to block 620, which is described below. If not, RC machine 142 obtains authority to modify the target cache line and, if necessary, a copy of the target cache line from another cache hierarchy or memory controller 106 by issuing one or more requests on system interconnect 104 (block 612). At block 614, the RC machine 142 again checks whether or not the issuing hardware thread has a valid reservation for the store target address of the STCX request, as the reservation may have been reset due to an intervening store access of another hardware thread while a copy of the target cache line in a writeable coherence state was being obtained at block 612. In response to a determination that the reservation is still set, the process passes to block 620, which is described below. However, in response to a determination at block 614 that the reservation is not still set (i.e., has been reset by the access of another hardware thread), RC machine 142 returns a fail indication to processor core 120 via pass/fail bus 174 to report that the STCX request failed to update L2 cache 130 (block 616). The process thereafter ends at block 630.

Block 620 illustrates RC machine 142 updating the target cache line in L2 storage array and directory 140 with the store data of the STCX request. RC machine 142 additionally returns a pass indication to processor core 120 via pass/fail bus 174 to report successful update of the L2 cache 130 (block 622). RC machine 142 also resets the issuing hardware thread's RSV flag 150 (block 624), as well as the RSV flag 150 of any other thread specifying a matching store target address in its associated RSV address register 148 (block 626). It should be noted that in this exemplary embodiment a STCX request only cancels the reservations of other threads at block 626 after it is verified that the STCX is going to succeed in its conditional update of shared memory. Thereafter, RC machine 142 returns to the idle state, and the process of FIG. 6A ends at block 630.

With reference now to FIG. 6B, there is depicted a high level logical flowchart of an exemplary method of processing a STORE request in a lower level cache in accordance with one embodiment. The process of FIG. 6B begins at block 650 as a STORE request is received by L2 cache 130 within L2 STQ 166. The STORE request is thereafter selected for dispatch to an idle RC machine 142 for processing, as shown at block 652.

In response to receipt of a STCX request for servicing, the dispatched RC machine 142 transitions to the busy state and resets the RSV flag 150 of any hardware thread other than the initiating hardware thread that specifies a matching store target address in its associated RSV address register 148 (block 656). RC machine 142 additionally determines whether or not the store target address of the STORE request hits in L2 storage array and directory 140 in a writeable coherence state that confers authority on L2 cache 130 to modify the target cache line (block 660). If so, the process passes to block 664, which is described below. If not, RC machine 142 obtains authority to modify the target cache line and, if necessary, a copy of the target cache line from another cache hierarchy or memory controller 106 by issuing one or more requests on system interconnect 104 (block 662). At block 664, RC machine 142 updates the target cache line in L2 storage array and directory 140 with the store data of the STORE request. Thereafter, RC machine 142 returns to an idle state, and the process of FIG. 6B ends at block 670.

Figure 7:
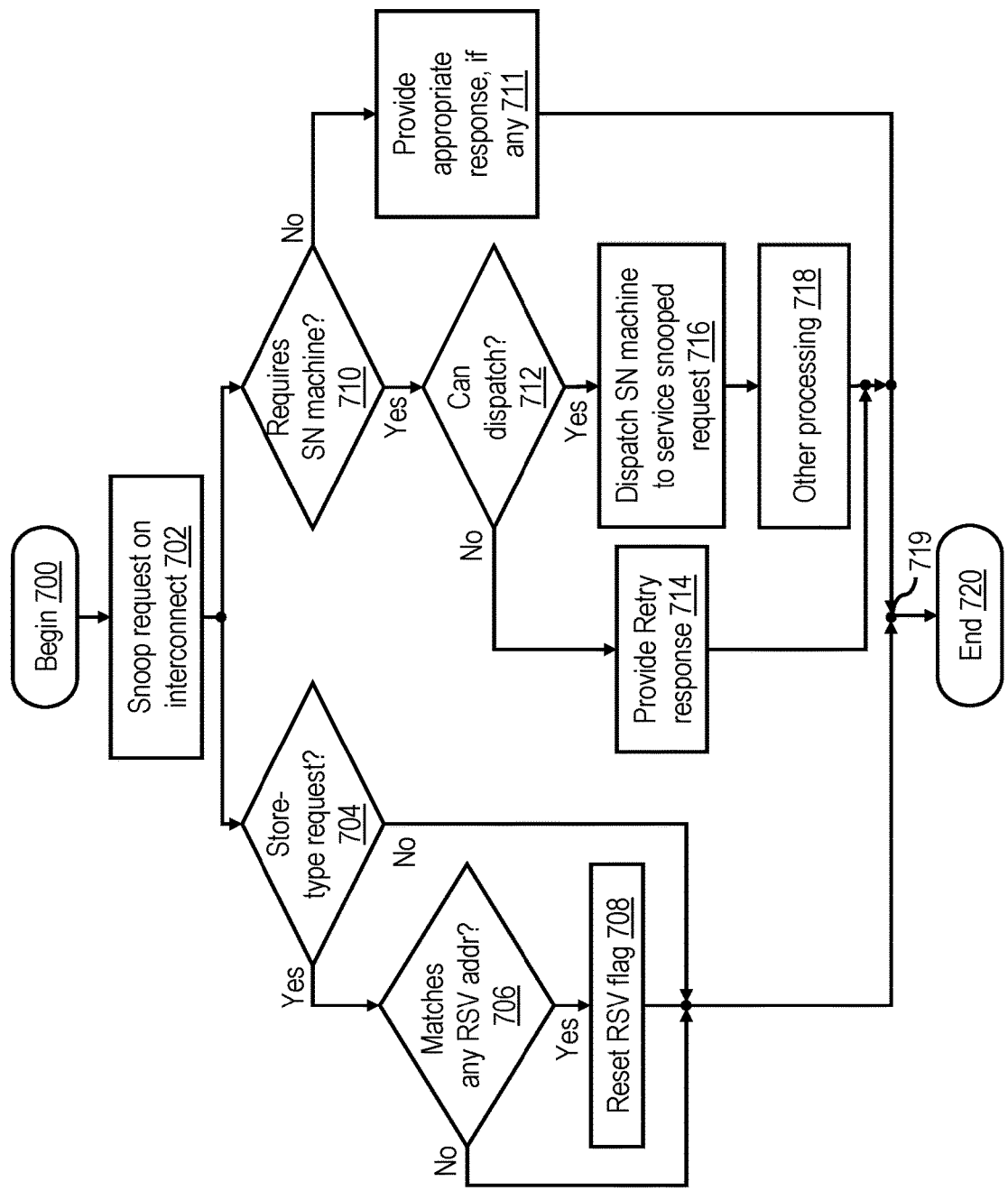
FIG. 7 is a high level logical flowchart of an exemplary method of processing a snooped request in accordance with one embodiment.

With reference now to FIG. 7, there is illustrated a high level logical flowchart of an exemplary method by which the L2 cache 130 of a processing unit 102 services a request snooped from a system interconnect in accordance with one embodiment. Those skilled in the art will appreciated that multiple instances of this process can be active in a given L2 cache 230 concurrently. As depicted, the process begins at block 700 and thereafter proceeds to block 702, which illustrates an L2 cache 130 snooping a request (e.g., issued by anther processing unit 102) on system interconnect 104 via snoop bus 170. Following block 702, the process of FIG. 7 bifurcates into two concurrent parallel subprocesses—a reservation update subprocess depicted at blocks 704-708 in which the affect, if any, of the snooped request on pending reservations tracked in the L2 cache 130 is managed, and a request servicing subprocess at blocks 710-718 in which the snooped request is serviced by the snooping L2 cache 130, if necessary. Following completion of both subprocesses, the two subprocesses merge at join point 719, and process of FIG. 7 ends at block 720.

Referring first to the reservation update subprocess, the snooping L2 cache 130 determines at block 704 whether or not the snooped request is a store-type request that modifies or requests authority to modify shared memory. If not, no update to any local reservation is required, and the reservation update subprocess proceeds to join point 719. If, however, the snooped request is a store-type request that indicates the intention to modify a target cache line, L2 cache 130 resets the RSV flag 150 associated with any of its RSV address registers 148 that stores the address of the target cache line (blocks 706-708). Following either block 706 or block 708, the reservation update subprocess proceeds to join point 719.

Referring now to the request servicing subprocess, L2 cache 130 determines at block 710 whether or not servicing the snooped request requires allocation of a SN machine 144. If not, no SN machine 144 is dispatched to service the snooped request. The L2 cache 130 will nevertheless provide the appropriate coherence response, if any (block 711). The request servicing subprocess then proceeds to join point 719. If, however, L2 cache 130 determines at block 710 that a SN machine 144 is required to service the snooped request, L2 cache 130 further determines at block 712 whether or not a SN machine 144 can presently be dispatched. In order to dispatch a SN machine 144, a SN machine 144 must be available (i.e., in the idle state) and no RC machine 146 or SN machine 144 can be busy servicing a request having a target cache line address matching that specified by the snooped request (among other dispatch constraints). Thus, for example, an RC machine 146 allocated to service a fronting LOAD request (as discussed above with reference to FIG. 4) will prevent the dispatch of a local SN machine 144 to service a snooped request specifying a conflicting (i.e., matching) target cache line address.

In response to a determination at block 712 that a SN machine 144 cannot presently be dispatched to service the snooped request, L2 cache 130 provides a Retry coherence response on system interconnect 104 to indicate its present inability to service the snooped request (block 714). (In response to this Retry coherence response, the source of the snooped request may later represent the request on system interconnect 104.) Following block 714, the request servicing subprocess proceeds to join point 719. If, however, L2 cache 130 determines at block 712 that a SN machine 144 can presently be dispatched to service the snooped request, L2 cache 130 dispatches an idle SN machine 144 to service the snooped request (block 716). The dispatched snoop machine 144 transitions from the idle state to the busy state and then performs at block 718 whatever additional processing is required to service the snooped request (e.g., updating L2 storage array and directory 140 and/or L1 cache 126, sourcing a copy of the target cache line, providing protocol-dependent coherence responses, etc.). Following completion of its processing at block 718, the SN machine 144 dispatched to service the snooped request transitions from the busy state to the idle state, and the request servicing subprocess proceeds to join point 719.

Figure 8:
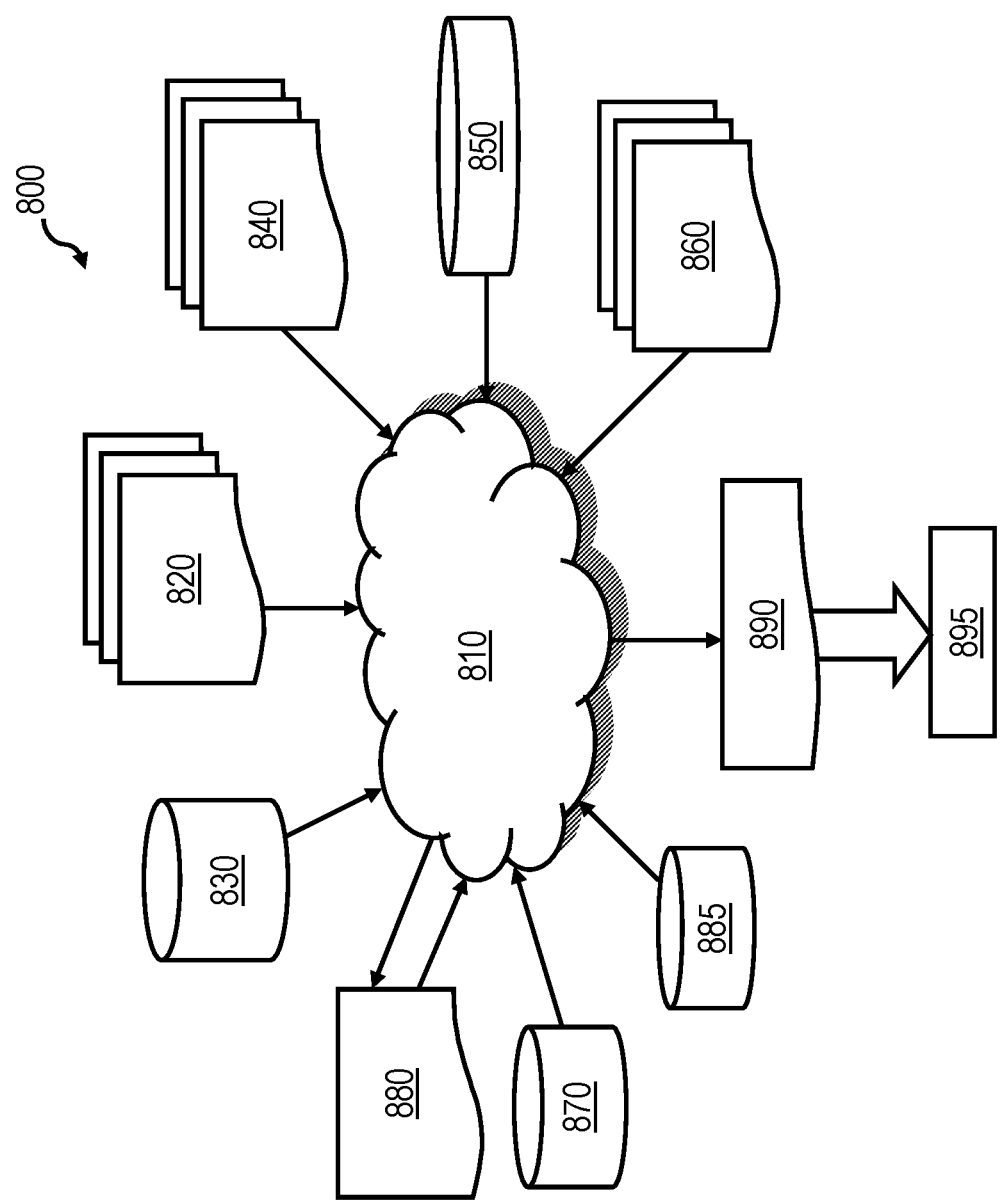
FIG. 8 is a block diagram of an exemplary design flow.

With reference now to FIG. 8, there is illustrated a block diagram of an exemplary design flow 800 used for example, in semiconductor IC logic design, simulation, test, layout, and manufacture. Design flow 800 includes processes, machines and/or mechanisms for processing design structures or devices to generate logically or otherwise functionally equivalent representations of the design structures and/or devices described above and shown herein. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 1020 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 810 to simulate or otherwise functionally represent an electronic component, circuit, electronic or logic module, apparatus, device, or system such as those shown herein. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 810 preferably employs and incorporates hardware and/or software modules for synthesizing, translating, or otherwise processing a design/simulation functional equivalent of the components, circuits, devices, or logic structures shown herein to generate a netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 810 may include hardware and software modules for processing a variety of input data structure types including netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 80 nm, etc.). The data structure types may further include design specifications 840, characterization data 850, verification data 860, design rules 890, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 890 may comprise a compiled, executable HDL simulation model that functionally simulates the devices shown herein.

Design structure 890 may also employ a data format used for the exchange of layout data of integrated circuits and/or symbolic data format (e.g., information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 890 may then proceed to a stage 895 where, for example, design structure 890: proceeds to tape-out, is released to manufacturing, is released to a mask house, is sent to another design house, is sent back to the customer, etc.

As has been described, in at least one embodiment, a data processing system includes multiple processing units all having access to a shared memory. A processing unit for a data processing system includes a cache memory having reservation logic and a processor core coupled to the cache memory. The processor includes an execution unit that executes instructions in a plurality of concurrent hardware threads of execution including at least first and second hardware threads. The instructions include, within the first hardware thread, a first load-reserve instruction that identifies a target address for which a reservation is requested. The processor core additionally includes a load unit that records the target address of the first load-reserve instruction and that, responsive to detecting, in the second hardware thread, a second load-reserve instruction identifying the target address recorded by the load unit, blocks the second load-reserve instruction from establishing a reservation for the target address in the reservation logic.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system, said processing unit comprising:
   a cache memory including reservation logic; and
   a processor core coupled to the cache memory, the processor core comprising:
      an execution unit that executes instructions in a plurality of concurrent hardware threads of execution including at least first and second hardware threads, wherein the instructions include, within the first hardware thread, a first load-reserve instruction that identifies a target address for which a reservation is requested; and
      a load unit that records, within the processor core, the target address of the first load-reserve instruction, detects, in the second hardware thread, a second load-reserve instruction identifying the target address recorded by the load unit, and based on detection of the second load-reserve instruction, blocks the second load-reserve instruction from establishing a reservation for the target address in the reservation logic of the cache memory.

2. The processing unit of claim 1, wherein the load unit blocks the second load-reserve instruction from establishing a reservation for the target address in the reservation logic by causing the processor core to discard execution results of the second load-reserve instruction.

3. The processing unit of claim 1, wherein:
   the load unit blocks the second load-reserve instruction from establishing a reservation for the target address in the reservation logic by delaying issuance from the processor core to the cache memory of a load-reserve request corresponding to the second load-reserve instruction.

4. The processing unit of claim 1, wherein the processor core includes a timer that determines a maximum duration of a protection interval for which the load unit blocks the second load-reserve instruction from obtaining a reservation for the target address in the reservation logic.

5. The processing unit of claim 1, wherein the load unit ends a protection interval for which the load unit blocks the second load-reserve instruction from obtaining a reservation for the target address in the reservation logic based on detection of a third load-reserve instruction or a store-conditional instruction in the first hardware thread.

6. The processing unit of claim 1, wherein the load unit, responsive to detecting in the second hardware thread a store-conditional instruction identifying the target address, blocks the store-conditional instruction from updating, in the cache memory, a memory location associated with the target address.

7. A data processing system, comprising:
   multiple processing units, including the processing unit of claim 1;
   a shared memory; and
   a system interconnect communicatively coupling the shared memory and the multiple processing units.

8. The processing unit of claim 1, wherein the load unit includes a blocking state machine that blocks the second load-reserve instruction from establishing a reservation.

9. A method of data processing in a processing unit of a data processing system, the processing unit including a processor core and a cache memory, said method comprising:
   an execution unit of the processor core executing instructions in a plurality of concurrent hardware threads of execution including at least first and second hardware threads, wherein the executing includes executing, within the first hardware thread, a first load-reserve instruction that identifies a target address for which a reservation is requested;
   a load unit of the processor core recording, within the processor core, the target address of the first load-reserve instruction; and
   the load unit detecting in the second hardware thread a second load-reserve instruction identifying the target address recorded within the processor core by the load unit and, based on detecting the second load-reserve instruction, blocking the second load-reserve instruction from establishing a reservation for the target address in reservation logic of the cache memory.

10. The method of claim 9, wherein the blocking includes the load unit blocking the second load-reserve instruction from establishing a reservation for the target address in the reservation logic by causing the processor core to discard execution results of the second load-reserve instruction.

11. The method of claim 9, wherein the blocking includes the load unit blocking the second load-reserve instruction from establishing a reservation for the target address in the reservation logic by delaying issuance from the processor core to the cache memory of a load-reserve request corresponding to the second load-reserve instruction.

12. The method of claim 9, wherein the processor core determining a maximum duration of a protection interval for which the load unit blocks the second load-reserve instruction from obtaining a reservation for the target address in the reservation logic by reference to a timer.

13. The method of claim 9, and further comprising the load unit ending a protection interval for which the load unit blocks the second load-reserve instruction from obtaining a reservation for the target address in the reservation logic based on detection of a third load-reserve instruction or a store-conditional instruction in the first hardware thread.

14. The method of claim 9, and further comprising the load unit, responsive to detecting in the second hardware thread a store-conditional instruction identifying the target address, blocks the store-conditional instruction from updating, in the cache memory, a memory location associated with the target address.

15. A design structure tangibly embodied in a machine-readable storage device for designing, manufacturing, or testing an integrated circuit, the design structure comprising:
   a processing unit, including:
      a cache memory including reservation logic; and
      a processor core coupled to the cache memory, the processor core comprising:
         an execution unit that executes instructions in a plurality of concurrent hardware threads of execution including at least first and second hardware threads, wherein the instructions include, within the first hardware thread, a first load-reserve instruction that identifies a target address for which a reservation is requested; and
         a load unit that records, within the processor core, the target address of the first load-reserve instruction, detects, in the second hardware thread, a second load-reserve instruction identifying the target address recorded by the load unit, and based on detection of the second load-reserve instruction, blocks the second load-reserve instruction from establishing a reservation for the target address in the reservation logic of the cache memory.

16. The design structure of claim 15, wherein the load unit blocks the second load-reserve instruction from establishing a reservation for the target address in the reservation logic by causing the processor core to discard execution results of the second load-reserve instruction.

17. The design structure of claim 15, wherein:
the load unit blocks the second load-reserve instruction from establishing a reservation for the target address in the reservation logic by delaying issuance from the processor core to the cache memory of a load-reserve request corresponding to the second load-reserve instruction.

18. The design structure of claim 15, wherein the processor core includes a timer that determines a maximum duration of a protection interval for which the load unit blocks the second load-reserve instruction from obtaining a reservation for the target address in the reservation logic.

19. The design structure of claim 15, wherein the load unit ends a protection interval for which the load unit blocks the second load-reserve instruction from obtaining a reservation for the target address in the reservation logic based on detection of a third load-reserve instruction or a store-conditional instruction in the first hardware thread.

20. The design structure of claim 15, wherein the load unit, responsive to detecting in the second hardware thread a store-conditional instruction identifying the target address, blocks the store-conditional instruction from updating, in the cache memory, a memory location associated with the target address.

* * * * *